United States Patent
Kabra et al.

(10) Patent No.: US 11,296,942 B1
(45) Date of Patent: Apr. 5, 2022

(54) RELATIVE DEVICE PLACEMENT CONFIGURATION

(71) Applicant: International Business Machines Corporation, Armonk, NY (US)

(72) Inventors: Namit Kabra, Hyderabad (IN); Sarbajit K. Rakshit, Kolkata (IN); Vijay Ekambaram, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/198,354

(22) Filed: Mar. 11, 2021

(51) Int. Cl.
   *G06F 15/177* (2006.01)
   *H04L 41/0866* (2022.01)
   *H04L 41/0816* (2022.01)

(52) U.S. Cl.
   CPC ...... *H04L 41/0866* (2013.01); *H04L 41/0816* (2013.01)

(58) Field of Classification Search
   CPC .............. H04L 41/0866; H04L 41/0816
   See application file for complete search history.

(56) References Cited

U.S. PATENT DOCUMENTS

| | | | |
|---|---|---|---|
| 6,226,035 B1* | 5/2001 | Korein | G02B 13/06 348/335 |
| 8,803,816 B2 | 8/2014 | Kilpatrick, II et al. | |
| 9,408,022 B1* | 8/2016 | O'Gwynn | H04W 76/15 |
| 9,545,221 B2 | 1/2017 | Adhikari | |
| 9,600,169 B2 | 3/2017 | de Sa et al. | |
| 10,009,935 B2 | 6/2018 | Caine | |
| 10,169,562 B2 | 1/2019 | Bandyopadhyay et al. | |
| 10,387,860 B2 | 8/2019 | Bhuiya et al. | |
| 2010/0033567 A1* | 2/2010 | Gupta | H04N 17/002 348/143 |
| 2010/0157064 A1* | 6/2010 | Cheng | H04N 5/247 348/169 |
| 2013/0085705 A1 | 4/2013 | Jano | |
| 2014/0341427 A1* | 11/2014 | Kawano | G06K 9/00255 382/103 |
| 2017/0111943 A1* | 4/2017 | Kersjes | H04W 4/80 |

(Continued)

FOREIGN PATENT DOCUMENTS

| | | |
|---|---|---|
| AU | 2014202245 B2 | 11/2014 |
| CN | 104205015 B | 2/2018 |
| EP | 2972669 B1 | 1/2016 |

OTHER PUBLICATIONS

Authors et al.: Disclosed Anonymously, IPCOM000252832D—Automatic Split Screen Configuration Functionality, Feb. 14, 2018, 3 pages.

(Continued)

*Primary Examiner* — Richard G Keehn
(74) *Attorney, Agent, or Firm* — Nolan M. Lawrence

(57) ABSTRACT

A presence of a secondary device is detected by a primary device. The primary device is operating in a first configuration. A current placement of the secondary device is identified by the primary device. Based on the current placement of the secondary device a list of potential future placements of the secondary device is determined by the primary device. The list of potential future placements of the secondary device is prioritized by the primary device. A first candidate future placement of the secondary device is selected based on the list by the primary device.

20 Claims, 4 Drawing Sheets

(56) References Cited

U.S. PATENT DOCUMENTS

| | | | |
|---|---|---|---|
| 2019/0214010 A1* | 7/2019 | Ma | G06F 3/167 |
| 2020/0118420 A1 | 4/2020 | Griffin | |
| 2020/0162331 A1* | 5/2020 | Harpur | H04W 4/023 |
| 2021/0243727 A1* | 8/2021 | Zhao | H04L 41/082 |

OTHER PUBLICATIONS

Dynamic user Interface Update Method, Jul. 21, 2016, IPCOM000247001D, 3 pages.
Proximity-based single-tap meeting room selection, IPCOM000251972D, Dec. 12, 2017, 5 pages.
Dynamic Volume Control Based on Proximity/Location of Identified User Devices, IPCOM000247831D, Oct. 6, 2016, 3 pages.

\* cited by examiner

RELATIVE DEVICE PLACEMENT CONFIGURATION

BACKGROUND

The present disclosure relates to device configuration, and more specifically, to identifying a secondary device placement and configuring a primary device.

Electronic computing devices ("devices") may be used to perform various tasks for users. For example, a smartphone may be used to communicate with other users or, in another example, to gather information from the Internet. Device portability has led to smaller devices having few buttons and interfaces.

SUMMARY

According to embodiments, disclosed are a method, system, and computer program product. A presence of a secondary device is detected. The detection is performed by a primary device. The primary device is operating in a first configuration. A current placement of the secondary device is identified. The identification is performed by the primary device. Based on the current placement of the secondary device, a list of potential future placements of the secondary device is determined. The determination is performed by the primary device. The list of potential future placements of the secondary device is prioritized. The prioritization is performed by the primary device. A first candidate future placement of the secondary device is selected based on the list. The selection is performed by the primary device.

Further, and according to embodiments, a presence of a secondary device is detected. The detection is performed by the secondary device. A primary device is operating in a first configuration. A current placement of the secondary device is identified. The identification is performed by the secondary device. Based on the current placement of the secondary device, a list of potential future placements of the secondary device is determined. The determination is performed by the secondary device. The list of potential future placements of the secondary device is prioritized. The prioritization is performed by the secondary device. A first candidate future placement of the secondary device is selected based on the list. The selection is performed by the secondary device.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

DETAILED DESCRIPTION

Figure 1:
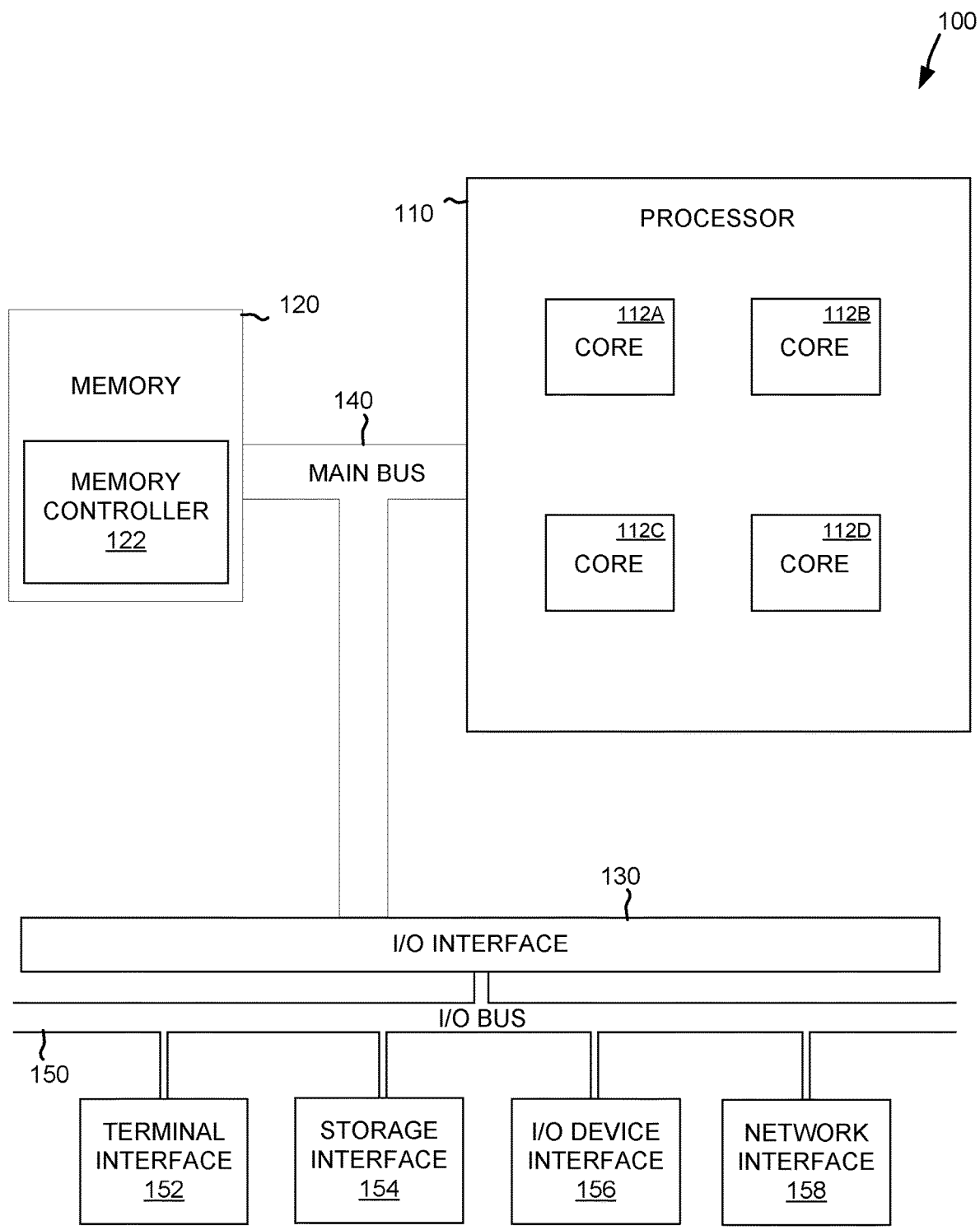
FIG. 1 depicts the representative major components of an example computer system that may be used, in accordance with some embodiments of the present disclosure.

Aspects of the present disclosure relate to device configuration; more particular aspects relate to identifying a secondary device placement and configuring a primary device. While the present disclosure is not necessarily limited to such applications, various aspects of the disclosure may be appreciated through a discussion of various examples using this context.

Electronic computing devices ("devices") may be one or more computers that a user interacts with to perform one or more digital tasks. Devices, as described herein, may include desktop computers or servers. Increasingly, users may interact with devices that are more and more portable, such as laptop computers, tablet computers, and smartphones. In further situations, users may interact with devices that are quite small and feature few or no physical interfaces, such as buttons—for example, one or more wearable devices, smart-watches, augmented reality headsets, virtual reality headsets, and the like. Further, other conventional devices that may have previously been configured without computers are increasingly including computer capabilities. For example, smart lights, smart speakers, voice-based assistants, smart appliances, and other household and industrial conventional devices may include a processor, memory, and input/output ("I/O") that were classically the components of a desktop computer.

As conventional devices have increasingly become embedded with computers, devices have generally become more pervasive and a universal part of a modern way of life for users. For example, users may at any time of day have at least two or more devices within reach of them, such as a cellphone and a portable computer. The cost of computer resources, such as processing power, and the pervasive connectivity to the Internet, have led to situations where users may be reliant on devices to perform a majority of the daily tasks of the user.

For example, smartphones are becoming inexpensive and Internet of Things ("IoT") devices are also becoming inexpensive. A user may have previously chosen to turn a light on in a room of a home by standing up, walking over to the light switch on the wall, and turning the light on by physically manipulating the light switch. Further, the user may then want to adjust the music playing on a stereo and the user may manipulate a knob on a stereo physically to adjust the volume of the stereo. That same user may also want to communicate with a friend using a desktop computer and an email program. With computers embedded into all conventional devices, a user may use a smartphone, a tablet, laptop, or some combination of devices to adjust a smart IoT light and adjust the volume of music playing (e.g., without getting up to directly touch the conventional devices directly). Concurrently, the user may also wish to perform computing tasks such as communication and information retrieval from the Internet, and perform physical calculations or budgetary calculations on one or more of the devices in the proximity of the user.

These tasks may lead to devices that have an abundance of new features and complexity. To facilitate this interaction and perform a litany of functions, devices may include a plurality of interfaces. For example, it may be beneficial for user interaction to include dedicated volume keys for a portable computing device such as a smartphone. It may also make sense to include other buttons, knobs, or sliders, to perform other tasks. In some instances, possibly separate accessory devices may be included. For example, a laptop may include a remote control that includes play/pause, volume, and brightness controls, to augment or increase the ways in which a user may wish to manipulate the device and conventional devices.

As devices become more portable, there becomes a technical limitation on the number of user-interface elements that may be placed on the devices. For example, a laptop that is quite thin may not have room on the side for various buttons, knobs, or other physical controls. Simultaneously, many devices may attempt to achieve a smaller physical size for other benefits. For example, a laptop that is physically larger may lead to one or more ergonomic drawbacks for the user. Another desire may be to reduce the cost of a device by removing accessories such as remote controls. Consequently, device makers may sacrifice interface usability by choosing to remove various interfaces of a device while maintaining a smaller device size.

One attempt to overcome portable devices with limited user interfaces may be to place device interaction models into a visual software interfaces of the device. For example, a laptop or smartphone may include one or more software utilities, applications, menus, or other interfaces. The various interfaces in a laptop may be configured and able to adjust the various devices and computer embedded conventional devices. However, the various interfaces may have a plurality of drawbacks. One drawback is that the various interfaces may need to be manually installed and/or configured. For example, a user may have to go to the Internet and download a utility or application for each device that the user wishes to operate with a smartphone. Similarly, the software requirements may be cumbersome and unintuitive. For example, a user may have to find a different utility for each function, operation, or configuration of a laptop that a user wishes to perform.

Further, the use of increasing menus may be complex and difficult for a user to operate. For example, a laptop may present configuration changes for various functions of the laptop through various menus and utilities. It may take additional time, and research (e.g., on the Internet) for a user to search through the menus and find the proper configuration adjustments. In another example, a device may not be technically configured to perform each function without a user having to launch the proper application or to close existing applications. In some situations, it may not be possible to adjust each function of the device in real-time. For example, a display utility may need to be open to adjust color or brightness of a laptop display, and an audio processing program may need to be opened to adjust the sound levels of an application. The laptop may not have enough memory to keep each program, utility, and/or software application open simultaneously to facilitate adjustment of each configuration and paired device that a user wishes to adjust.

Another attempt to overcome the lack of interfaces with devices is to use the input methods of a secondary device that is paired to the first device. For example, a user may have a smartphone and a laptop computer. The user may wish to utilize the smartphone as an extra input method for controlling various configurations of the laptop. This may have several drawbacks though. First, each function, configuration, or interface, may only support standard interfaces (e.g., mouse input, keyboard input) but may not support accessory input such as input from the smartphone. Second, the defined interface may be limited to very specific operations, such as raising or lowering of a smartphone to indicate volume up or volume down. Third, certain configurations and operations may not be reassignable or may already be assigned to another function. For example, a user may have assigned movement of their smartphone to correspond to changing the brightness of their laptop while at home one night. Later, the user may travel to a coffee shop and may wish the same movement to adjust the volume of speakers on the laptop. The fixed pairings and configurations may not permit the user to adjust the volume of the laptop.

Fourth, the process of pairing may be unintuitive and/or unreliable. For example, a user may wish to have a secondary device input perform a particular function of a primary device responsively, such as within a few seconds of providing input to the secondary to adjust the volume on the primary device. Unfortunately, many devices may need to go through a pairing process that involves searching through multiple menus on each device, removing an existing device pairing of an unrelated device, performing a repairing action between two devices, or some combination that may take multiple steps and occur over a duration of minutes or more. Fifth, the rules and definitions surrounding a device-to-device configuration interaction may be rigid and inflexible. For example, an accessory device may operate through a predefined set of rules to adjust a configuration on a laptop. The predefined set of rules may dictate that a secondary or accessory device must be rotated through space a certain fixed amount, such as a partial rotation from 0 degrees to 90 degrees. The predefined set of rules may originally have been created for a smartphone to control a desktop computer in an office. A user may wish to adjust a laptop configuration based on the set of rules with an accessory device that is a tablet computer while at a coffee shop. The table where the user is sitting at the coffee shop may be physically smaller and the tablet may be physically larger than the office environment. The physical space issues may make performance of rotation of the tablet computer physically impossible; because the rules are predefined, a user may not be able to use the tablet in the coffee shop to alter configuration of the laptop.

Relative Device Placement Configuration ("RDPC") may overcome one or more of the technical limitations of other attempts to provide additional user interaction and device configuration changes, while maintaining device portability and interaction flexibility. The RDPC may operate by adjusting the configuration of a various devices based on the placement of other devices. The RDPC may operate by configuring devices that are electronic computing devices, such as desktop and portable computer, tablets, smartphones, smartwatches, and the like. The RDPC may operate by receiving placement information from other devices ("secondary devices") such as other computers smartphones, tablets, smart-watches, augmented reality headsets, virtual reality headsets, and the like. The RDPC may also operate based off of the presence or placement of other conventional devices with embedded computing capabilities, such as smart lights, smart appliances, and other relevant IoT devices. The RDPC may also operate based off of the presence or placement of automated voice-based assistants, smart speakers, or other computing devices.

The RDPC may operate in concert with the placement, location, position, or relative placement of a plurality of devices to facilitate the configuration of a device. For example, a first or primary device may have configuration changes based on or in response to the placement of one or more other or secondary devices. The placement of a device may include one or more of the following: orientation, position, angular position, attitude, rotation, or direction of a device. The placement of a device may include the relative position/orientation with respect to a primary device. More specifically, it refers to the rotation and translation from a current placement.

Further, the RDPC may operate by determining potential future placements for a secondary device. The RDPC may not require a particular device to be in a specific position to begin detecting placement and adjusting configuration. Specifically, the RDPC may operate by determining, requesting, or otherwise identifying the current placement of a secondary device. The RDPC may continue by determining potential future placements for the secondary device.

The RDPC may be configured prioritize and select one or more future placements that may be used for adjusting a primary device. These reassignments may operate without concern or without adherence to fixed placement schemes. It may be advantageous to dynamically reassign a starting or current placement depending on the type, shape, size, weight, or other characteristics. This may overcome certain drawbacks when specific placements are unwieldly or unintuitive. For example, using a RDPC to adjust configuration of a tablet computer, a smartphone's current placement may be different than a laptop or a smartwatch. The RDPC may determine that the current placement for the smartphone as downward facing on a desk is indicative that flipping the smartphone over from downward facing to upward facing would be beneficial to control a configuration change in the tablet. In another example, to adjust a configuration on the tablet, the current placement of the laptop may be open with the laptop screen tilted at 90 degrees from the laptop base. The RDPC may identify the current placement of the laptop with a 90 degree-tilt of the screen, and responsively may determine that a future placement with a high likelihood of success is to place the laptop with the screen at a 100 degree-tilt, and with a slightly lower priority place the laptop with the screen at an 80-degree tilt to effect a configuration change of the tablet.

The RDPC may operate to adjust configurations of a primary device. Configurations may be one or more settings, rules, applications, features, or other aspects of the primary device. For example, a first configuration may be a 55% volume setting of a laptop. A second configuration may be a future configuration of a 60% volume setting or a future configuration of a 48% volume setting. In another example, a first configuration may be an application is not currently running. A second configuration could be an application being launched or running.

FIG. 1 depicts the representative major components of an example computer system 100 (alternatively, computer) that may be used, in accordance with some embodiments of the present disclosure. It is appreciated that individual components may vary in complexity, number, type, and/or configuration. The particular examples disclosed are for example purposes only and are not necessarily the only such variations. The computer system 100 may include a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may include a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may include an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100—including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

Figure 2A:
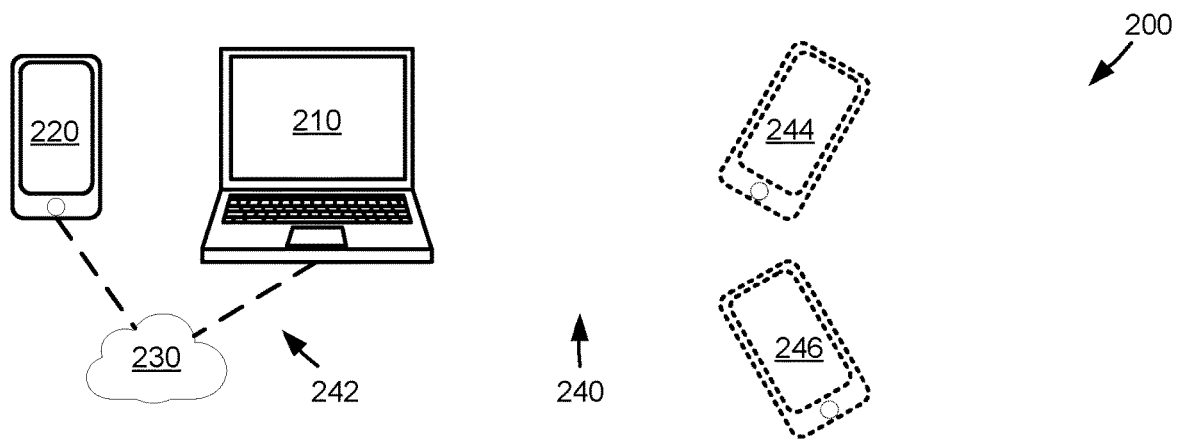
FIG. 2A depicts a system for performing relative device placement configuration in a first example scenario, consistent with some embodiments of the invention.
Figure 2B:
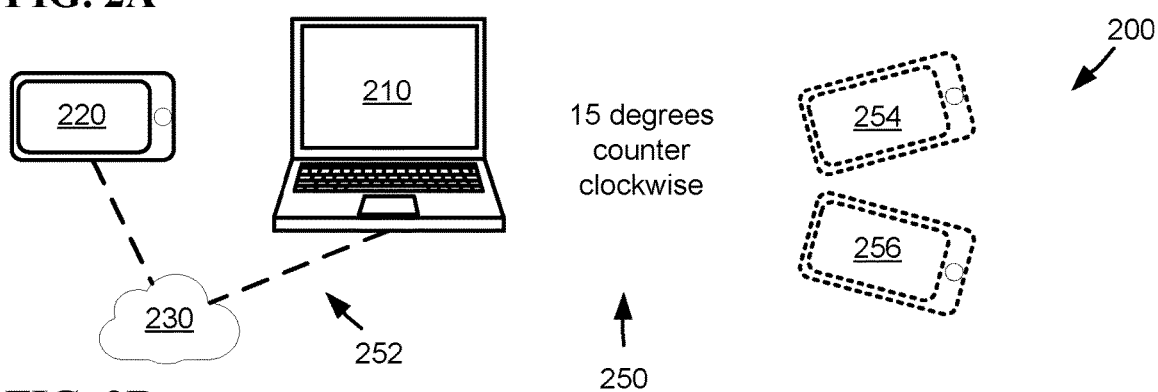
FIG. 2B depicts a system for performing relative device placement configuration in a second example scenario, consistent with some embodiments of the invention.
Figure 2C:
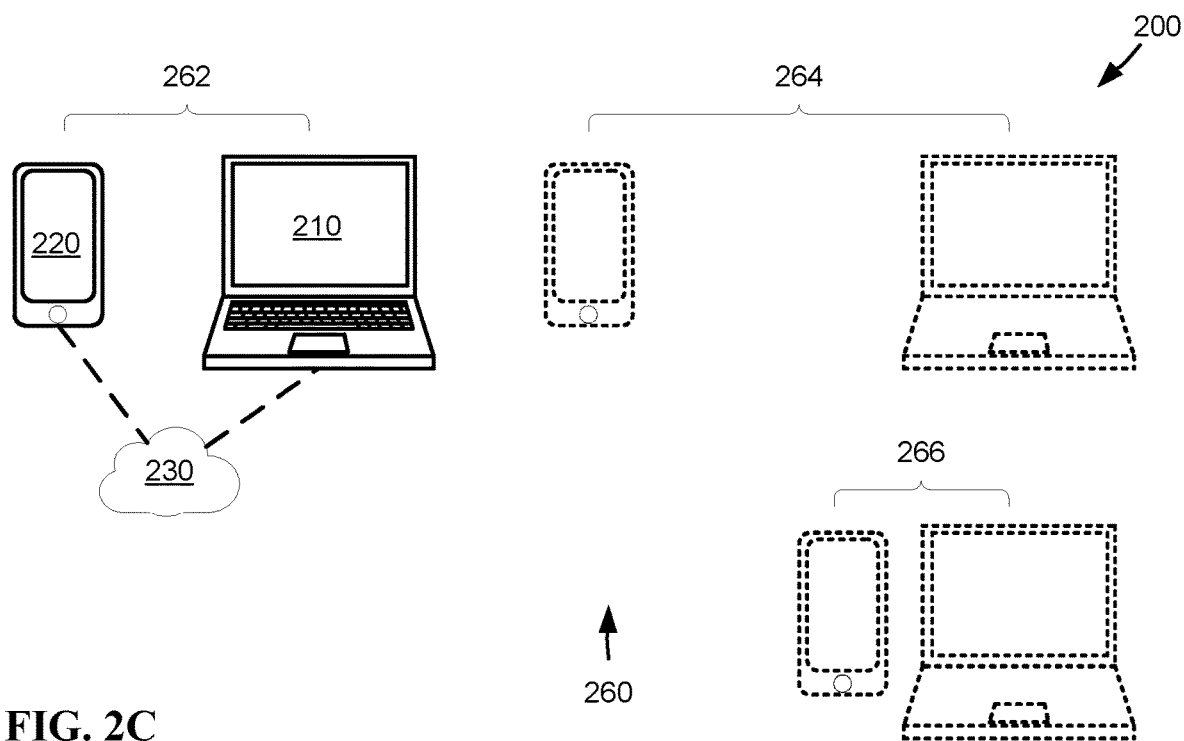
FIG. 2C depicts a system performing relative device placement configuration in a third example scenario, consistent with some embodiments of the invention.

FIGS. 2A, 2B, and 2C depict an example system 200 configured to perform RDPC to adjust configurations, consistent with some embodiments of the disclosure. The system 200 may include a primary device 210, a secondary device 220, and a network 230 that communicatively couples the primary device and the secondary device 220.

The primary device 210 may be a first device, such as a laptop or other relevant computing device. The primary device 210 may be a computer having a relevant processor, memory, and I/O (e.g., computer system 100). The secondary device 220 may be a second device, such as a smartphone or other relevant computing device. The secondary device 220 may be a computer having a relevant processor, memory, and I/O (e.g., computer system 100). In some embodiments, the primary device 210 may include one or more sensors or sensor units (not depicted) configured to determine and calculate placement. In some embodiments, the secondary device 220 may include one or more sensors or sensor units (not depicted) configured to determine and calculate placement. Specifically, the secondary device 220 may include an acceleration sensor, inertial motion unit (IMU), single accelerometer, plurality of accelerometers (e.g., 3-axis accelerometers), gyroscopic sensors, Micro Electro Mechanical System sensors, magnetometers, and other relevant position sensors.

The network 230 may be a network configured to facilitate communication between the primary device 210 and the secondary device 220. The network 230 may be a Bluetooth, wired, wireless, or other relevant network. The primary device 210 and the secondary device 220 may communicate with each other through the network to communicate position. For example, the secondary device 220 may be configured to determine its current placement based on the sensors, and may transmit the current placement through the network 230 to the primary device 210. In some embodiments, the primary device 210 and the secondary device 220 may communicate with each other without connecting to an external network, such as network 230. For example, the primary device 210 and the secondary device 220 may each have wireless transceivers (not depicted). One of the primary device 210 or the secondary device 220 may establish a personal area network by sending one or more datagrams or other network packets from the wireless transceiver to broadcast availability of the personal area network to the other of the primary device 210 or the secondary device 220.

The system 200 may be configured to assign a future configuration and that may be based on a priority or environment of the primary device or the secondary device. Specifically, the system 200 may leverage RDPC to operate a run-time mapping. The run-time mapping may include a generated list of future placements of a particular device. In a first example, the primary device 210 may poll, request, detect, or otherwise identify the current placement of the secondary device 220. In a second example, the secondary device, may send, transmit, offer or otherwise provide the current placement to the primary device 210. The current placement may be used to generate a list of future placements for the device. The list may be prioritized, ranked, sorted, or otherwise arranged, such that placements that are intuitive or easy to be performed of the secondary device 220 are given a higher priority than other placements. The prioritization of future placements of the secondary device 220 may be based on its current placement, the capability of the secondary device 220 or the primary device 210, and/or relative context with respect to the primary device 210.

In some embodiments, the secondary device 220 may include a foldable component (not depicted) for use in performing RDPC. Specifically, the secondary device 220 may be a foldable smartphone, comprising two separate sides coupled together with a foldable organic light-emitting diode screen and a physical hinge. The system 200 may leverage RDPC to adjust the configuration of the primary device 210 based on the placement of the secondary device 220 with respect to the hinge and screen of the secondary device 220. Specifically, the secondary device 220 may be folded at 180-degrees or alternatively, a flat placement. The RDPC of system 200 may identify that the secondary device 220 is folded flat, and may assign a future placement of the secondary device 220 with the hinge and screen folded at 140-degrees, for an updated second configuration of the primary device 210, such as decreasing the volume of the primary device 210.

In some embodiments, the secondary device 220 and/or the primary device 210 may be configured to determine the relative position with respect to each other. In a first example, the primary device 210 and/or the secondary device 220 may be configured with an internal wireless transceiver configured to perform ultra wideband ("UWB") communication and signal transmission (not depicted). The included UWB transceiver of the primary device 210 and/or the secondary device 220 may be configured for performing UWB transmission and reception (e.g., radio frequency transmission that does not interfere with narrowband and carrier wave transmission along a similar frequency band). The included UB transceiver may be configured to determine the relative position of the secondary device 220 with respect to the primary device 210. In a second example, another relevant networking and location technology, such as a low-latency time-of-flight sensor (not depicted), may be used for location with respect to other devices.

In some embodiments, the system 200 may be configured to perform RDPC by selecting a second configuration of a primary device 210, based on the location of the primary device and/or the secondary device 220. In a first example, the primary device 210 and/or the secondary device 220 may have a transceiver configured to receive signals from an IoT device. In a second example, the primary device 210 and/or the secondary device 220 may have a global positioning sensor ("GPS sensor") for determining a physical geographical location. Based on reception of the physical location, a future configuration of the primary device 210 may be selected. For example, if primary device 210 is in a coffee shop, a future configuration of the primary device may be to lower the volume of the primary device 210.

The system 200 may leverage RDPC to provide historical learning about determining a likely future placement of the secondary device 220. The system 200 may leverage RDPC to provide historical learning about determining a likely future configuration of the primary device 220. The likelihood may be determined based on previous configuration changes of the primary device 210. The likelihood may be determined based on a geographic location of the primary device 210. The likelihood maybe determined based on the proximity of the primary device 210 to other devices (e.g., conventional devices embedded with computer systems, proximity of IoT devices, presence or connection to a particular wireless network name).

The RDPC may perform machine learning to determine a pattern of history, to facilitate historical learning and to identify a likely a future placement for a secondary device (e.g., secondary device 220) and/or to determine a likely future configuration of a primary device (e.g., primary device 210). In some embodiments, system 200 may execute machine learning on data using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

FIG. 2A depicts a system 200 for performing relative device placement configuration in a first example scenario 240. In first example scenario 240, secondary device 220 is in a first placement 242. The first placement 242 is with a long axis of the secondary device 220 parallel with the primary device 210. The RDPC may operate on the primary device 210 to determine the alignment, orientation, or other placement of the secondary device 220. The RDPC may operate on the secondary device 220 to determine the alignment, orientation, or other placement of the secondary device 220. The primary device 210 and the secondary device 220 may communicate with each other to permit the RDPC to compare the placements over time. For example, the primary device 210 and the secondary device 220 may be paired to each other, along with being paired to other accessories and devices such as wireless headphones (not depicted).

In the first example scenario 240, system 200 may prioritize a first future candidate placement 244 and a second future candidate placement 246 of a plurality of potential future placements as part of generating a list of potential future placements. Specifically, the RDPC may be software, hardware, or firmware executing on the primary device 210, the secondary device 220, or both. The RDPC may monitor operation of the primary device 210, for various configurations.

The various configurations may include a previous configurations and other historical data, as well as previous inputs or habits of a user of the primary device 210. For example, a user may adjust the brightness of the primary device 210 by selecting various software menus and sub-menus during a particular time of day. The RDPC may determine a first configuration of a particular brightness setting, and may assign, based on an identified current placement of 242, the first candidate future placement 244 for a future configuration. The future configuration may be to change operation of the primary device 210; specifically, to increase the brightness of the display of the primary device 210. The first candidate future placement 244 may be selected based on the current placement 242, the geographic location of the primary device 220, the geographic location of the primary device 210, or some combination. For example, the first candidate future placement 244 may be rotation of the secondary device clockwise by 30 degrees. Similarly, a second candidate future placement 246 may be to rotate the device counterclockwise by 30 degrees. The second candidate future placement 246 may be the second most prioritized potential future placement of a list of potential future placements. The second candidate future placement 246 may be a third configuration for the primary device 210. Specifically, the third configuration may be a future configuration where the brightness of the display of the primary device 210 is decreased.

FIG. 2B depicts a system 200 for performing relative device placement configuration in a second example scenario 250. The second example scenario 250 may be an alternative to the first example scenario 240. For example, in the second example scenario 250, secondary device 220 is in a second placement 252. The second placement 252 is different from the first placement 242, with a long axis of the secondary device 220 perpendicular with the primary device 210. The RDPC may operate on the primary device 210 to determine the alignment, orientation, or other placement of the secondary device 220. The RDPC may operate on the secondary device 220 to determine the alignment, orientation, or other placement of the secondary device 220. The primary device 210 and the secondary device 220 may communicate with each other to permit the RDPC to compare the placements over time. For example, the primary device 210 and the secondary device 220 may be paired to each other, along with being paired to other accessories and devices such as wireless headphones (not depicted).

Despite not being in the same starting placement, the system 200 may determine first future candidate placement 254 and first future candidate placement 256 based on the second placement 252 being the current placement of the secondary device 220. The determination of the first future candidate placement 254 and a second future candidate placement 256 may be prioritizations of a list of a plurality of potential future placements. Similarly, to the first example scenario 240, the RDPC may monitor operation of the primary device 210, for various configurations in the second example scenario 250.

Specifically, (and similarly to the first example scenario 240) the system 200 may leverage the RDPC to monitor the various configurations and may include a previous configurations and other historical data, and previous user inputs to the primary device 210 in the second example scenario 250. Again, a user may adjust the brightness of the primary device 210 by selecting various software menus and sub-menus during a particular time of day. The RDPC may determine this first configuration of a particular brightness setting, and may assign, based on an identified current placement of 252, the first candidate future placement 254 for a future configuration. The future configuration may be to change operation of the primary device 210; specifically, to increase the brightness of the display of the primary device 210. The first candidate future placement 254 may be selected based on the current placement 252, the geographic location of the primary device 220, the geographic location of the primary device 210, or some combination. For example, the first candidate future placement 252 may be rotation of the secondary device counterclockwise by 15 degrees. Similarly, a second candidate future placement 256 may be to rotate the device clockwise by 15 degrees. The second candidate future placement 256 may be the second most prioritized potential future placement of a list of potential future placements. The second candidate future placement 256 may be a third configuration for the primary device 210. Specifically, the third configuration may be a future configuration where the brightness of the display of the primary device 210 is decreased.

FIG. 2C depicts system 200 performing relative device placement configuration in a third example scenario 260. The third example scenario 260 may be in addition to the first example scenario 240. In detail, in the third example scenario 260, secondary device 220 is in a third placement 262 as well as in the first placement 242. The third placement 262 is similar to the first placement 242, with a long axis of the secondary device 220 parallel with the primary device 210. The first placement 242 may be based on the rotation or orientation of the secondary device 220 in isolation. The RDPC (while executing on the primary device 210 and/or secondary device 220) may identify the first placement 242 of the secondary device 220 without respect to the primary device 210. Further, the RDPC may identify the third placement 262 with respect to both the primary device 210 and the secondary device 220—by determining the distance between the primary device and the secondary device.

In the third example scenario 260, the system 200 may assign additional configuration and operation changes to the primary device 210. Specifically, the primary device 210 may also include capabilities to play audible sounds, such as music or a podcast. The RDPC of the system 200 may be configured to identify based on the third placement 262 a first candidate future placement 264 and a second candidate future placement 266 of a list of a plurality of potential future placements of the secondary device 220. The first candidate future placement 264 may be a placement that moves the secondary device 220 away from the primary device 210. The second candidate future placement 266 may be a placement that move the secondary device 220 closer to the primary device 210. The system 200 may determine that an adjustment of the volume of the primary device 210 is a likely updated configuration. The system 200 may then assign the first candidate future placement 264 to decreasing the volume of the primary device 210 and the second candidate future placement 266 to increasing the volume of the primary device 210.

The assignment of the first candidate future placement 264 and the second candidate future placement 266 may be concurrent with the first example scenario 240. Specifically, the system 200 may assign the first candidate future placement 264 without unassigning the first candidate placement 244. Further, the system 200 may assign the second candidate future placement 266 without unassigning the second candidate placement 246. This may permit control of the primary device 210 for various configurations, such as to simultaneously control the volume and brightness of the primary device with the placement of the secondary device 220. Though the adjustment of the volume and brightness are contemplated based on RDPC in system 200. One of skill in the art would appreciate that other configuration changes of primary device 210 (e.g., permitting/silencing of notifications, launching/quitting of applications, disabling/enabling a wireless transceiver) may be controlled by placement of secondary device 220 in system 200.

Figure 3A:
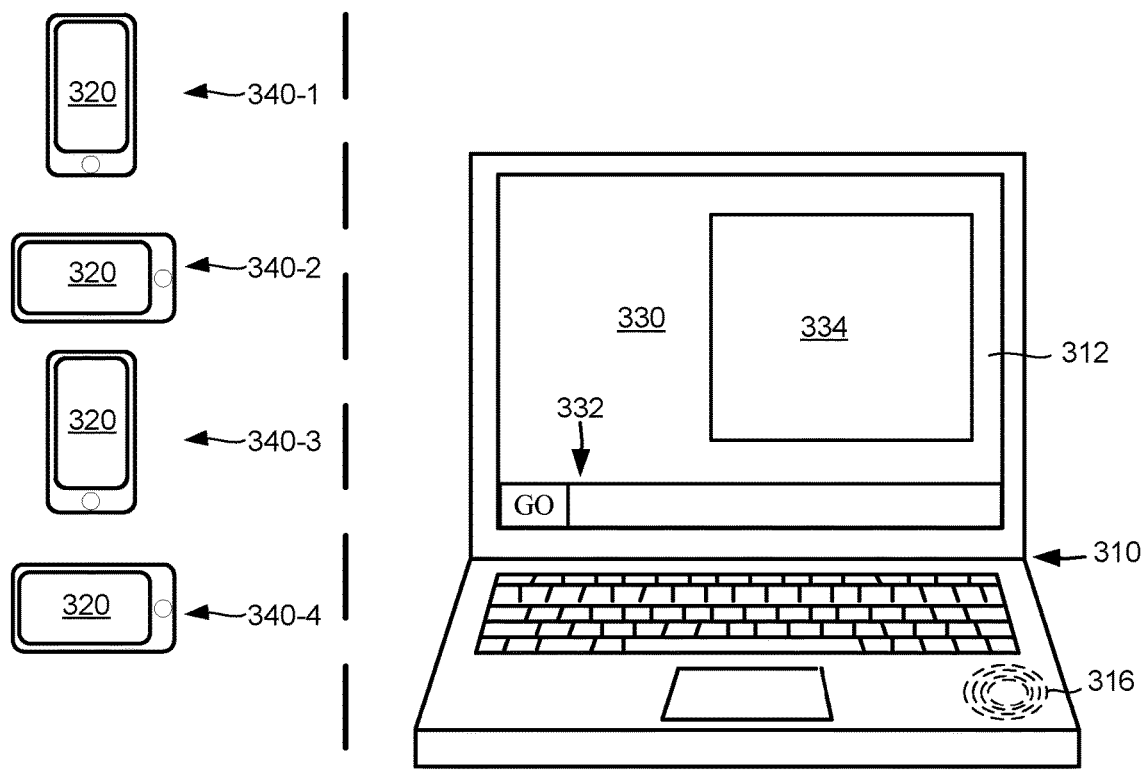
FIG. 3A an example interface of a system using relative device placement configuration, consistent with some embodiments of the invention.

FIG. 3A an example interface 330 of a system 300 using relative device placement configuration, consistent with some embodiments of the invention. System 300 may include a first device 310 and a second device 320. The first device 310 and the second device 320 may be unpaired and operating in a passive state before performing RDPC. Specifically, the first device 310 may have a network transceiver, and may be operating in a listen mode. During operation in the listen mode, the first device 310 may be monitoring for a signal that an accessory device is to provide RDPC placements for adjusting future configurations of the first device 310. In some embodiments, during operation in the listen mode, the first device 310 may be monitoring for a placement signature. In some embodiments, the second device 320 may be monitoring for a placement signature.

The first device 310 of system 300 may be considered a primary device. The first device 310 may operate in a current configuration and may include a plurality of additional potential configurations for operation. For example, first device 310 may include various programs, settings, features, interfaces, or other operations to be performed, such as playing a song, writing a paper, or adjusting speed of a trackpad. The first device 310 may include one more I/O components, including the following: a display 312 to visual provide visual output, and a speaker 316 to audibly provide sound output. The example interface 330 of the system 300 may reflect RDPC before an accessory device is selected for placement to adjust configuration of a primary device. Specifically, example interface 330 may be an operating system graphical user interface (GUI) of an operating system being executed by first device 310 and being visually provided by display 312. The operating system GUI 330 may include a menu interface element 332 and an application interface element 334. The menu interface element 332 may, in response to input from a point (not depicted), perform one or more configuration changes for the first device 310. For example, using interface element 332 to launch programs, change settings, and otherwise alter the first device 310. The application interface element 334 may visually represent a program that is currently running on the first device 310.

The second device 320 may be considered an accessory device 320. The second device 320 may include one or more sensors (e.g., IMU sensor, GPS sensor), configured to monitor the placement of second device 320. The second device 320 may be configured to respond to a device placement signature, and responsively indicate active RDPC placement. Specifically, the second device 320 may receive, at an earlier time or time period, a series, order, sequence, or other relevant plurality of positions of the second device 320. For example, a user may begin generating a device placement signature by instructing the second device 320 to listen for, monitor, or otherwise detect placements of the second device over a short period of time. Next, the user begins generating a device placement signature including positions, rotates, lifts, tips, tilts, translated, moves, or otherwise places the second device 320 into a first signature position. Further, the user repeats by continuing to place the second device 320 into a second signature position. The user may repeat the placing of the second device 320 into additional device signature positions. Finally, the user may provide a second instruction to the second device 320 to confirm the user is done generating the device placement signature, and the second device may responsively store the device placement signature (e.g., in a memory, in a secure element, in an encrypted memory). The device placement signature may be of any relevant length of placements (e.g., two placements, five placements, seventeen placements).

At 340, the second device 320 may be placed into a sequence of placements that match a device placement signature. In detail, at 340-1 device 320 may be placed into a first existing signature placement. At 340-2 device 320 may be placed into a second existing signature placement. At 340-3 device 320 may be placed into a third existing signature placement. At 340-4 device 320 may be placed into a fourth existing signature placement. The time between placements may be variable. For example, the time between 340-1 and 340-2 may be a period of time between one and five seconds. Continuing the example, the time between 340-2 and 340-3 may be between 250 milliseconds and two seconds. The second device 320 may compare the placement of the second device 320 at 340-1, 340-2, 340-3, and 340-4 to determine that a device placement signature has successfully been performed. The successful device placement signature may be communicated to the first device 310. In some embodiments, the device placement signature may be monitored by the first device 310 and the determination of a successful device placement signature may be performed directly on the first device 310.

Figure 3B:
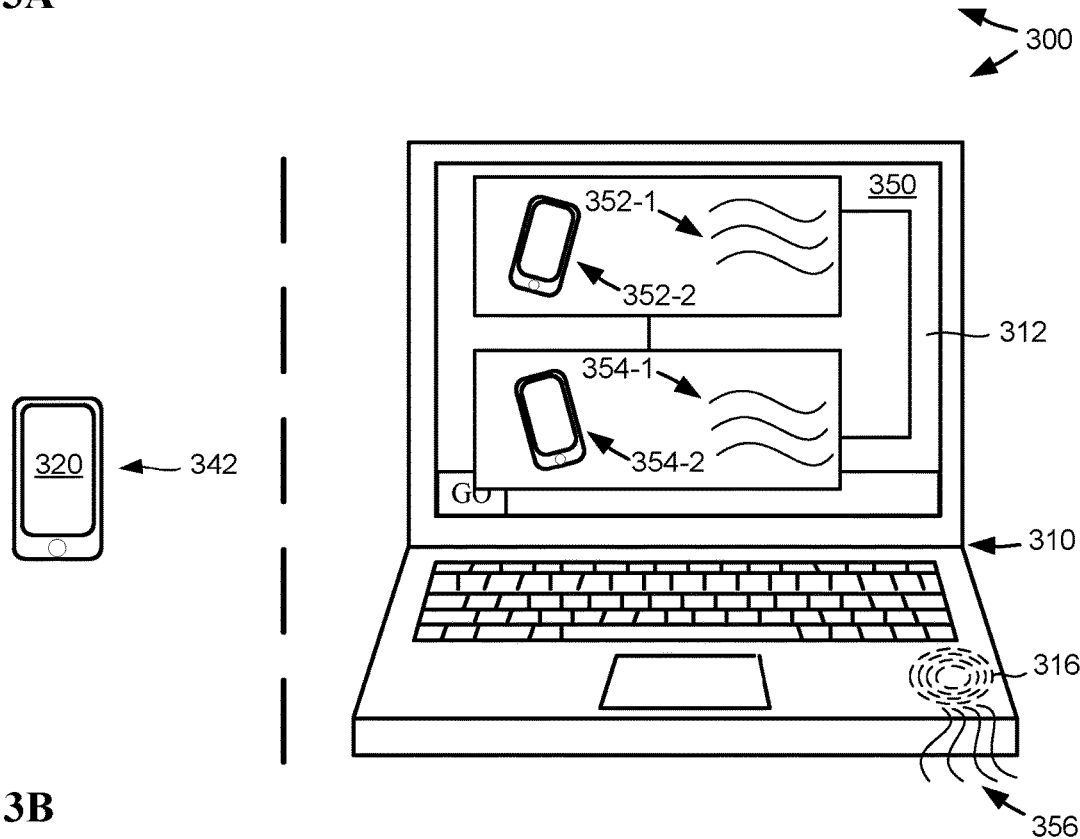
FIG. 3B an updated example interface of the system using relative device placement, consistent with some embodiments of the invention.

FIG. 3B an updated example interface 350 of the system 300 using relative device placement, consistent with some embodiments of the invention. The updated example interface 350 may be an audiovisual interface that is altered in response to a successful device placement signature. Specifically, the second device 320 may be placed into a post device placement signature placement 342. The post device placement signature placement 342 may be the same as the last placement of the device placement signature. The post device placement signature placement 342 may be a different placement than the last placement of the last device placement signature.

Responsively, the updated example interface 350 may communicate, to a user, potential future placements of the second device 320 to select future configurations of the first device 310. In detail, updated example interface 350 may display a first candidate future placement representation 352 on the display 312. The first candidate future placement 352 may have a first textual description 352-1 and a first graphical description 352-2. The first textual description 352-1 may describe a setting, application, or other relevant future configuration for operation of the first device 310, (e.g., increase the volume of first device 310, decrease the brightness of the display 312, launch an application, alter the state of a connected smart home device). The first graphical description 352-2 may depict a first candidate future placement of the second device 320 that would perform the relevant future configuration for operation of the first device 310. Further, the updated example interface 350 may also display a second candidate future placement representation 354 on the display 312. The second candidate future placement 354 may have a second textual description 354-1 and a second graphical description 354-2. The second textual description 352-2 may describe a second relevant future configuration for operation of the first device 310, (e.g., decrease the volume of first device 310, increase the brightness of the display 312, switch tabs in a single application, silence notifications on the first device 310). The second graphical description 352-4 may depict a second candidate future placement of the second device 320 that would perform the second relevant future configuration for operation of the first device 310. In some embodiments, the updated example interface 350 may be audible, such as verbal descriptions of selected future candidate placements and associated future configurations of the first device 310 as descriptive speech 356.

Figure 4:
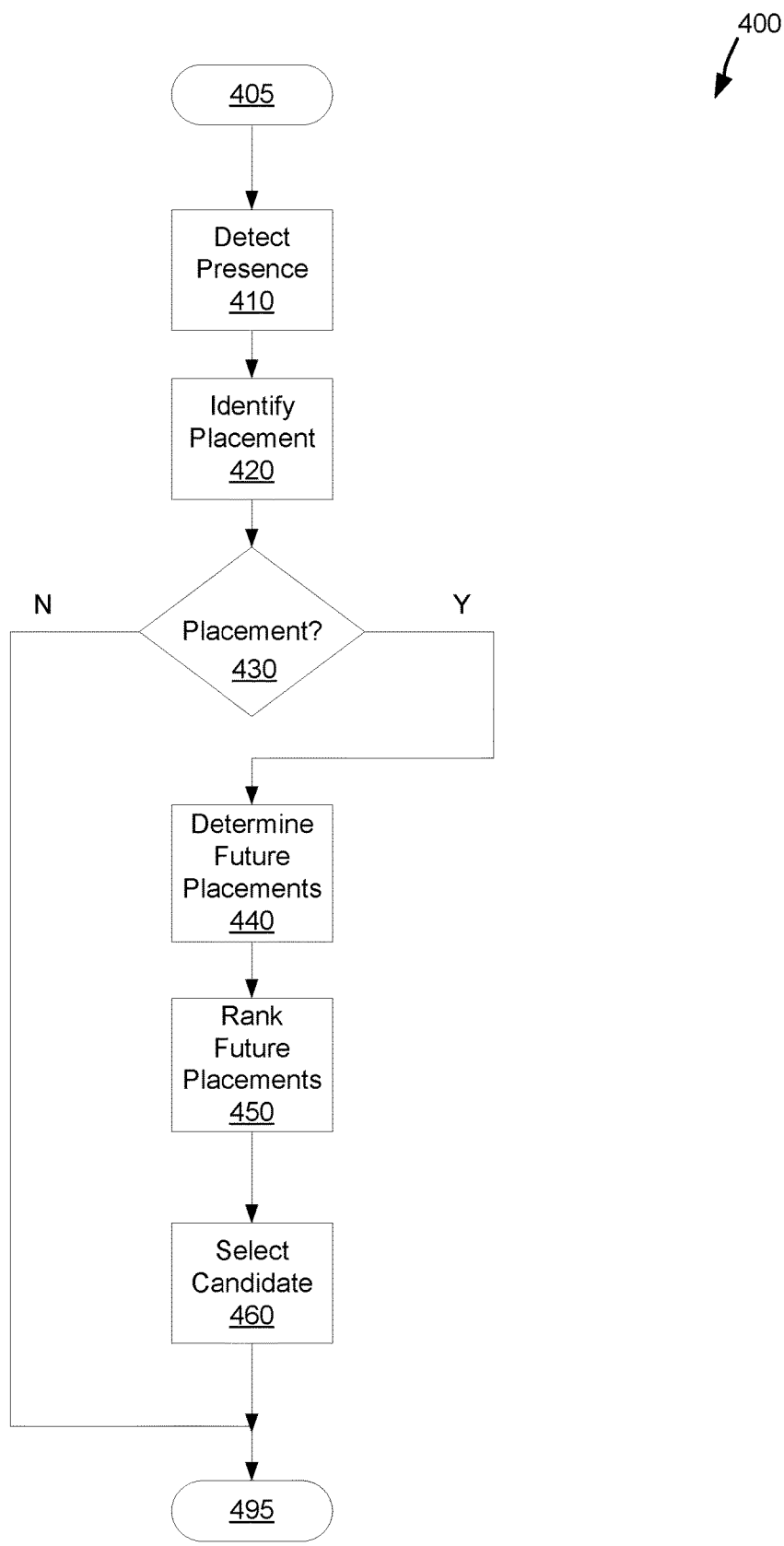
FIG. 4 depicts a method of device configuration based on the placement of another device, consistent with some embodiments of the disclosure While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

FIG. 4 depicts a method 400 of device configuration based on the placement of another device, consistent with some embodiments of the disclosure. Method 400 may generally be implemented in fixed-functionality hardware, configurable logic, logic instructions, etc., or any combination thereof. For example, the logic instructions might include assembler instructions, ISA instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.). Method 400 may be executed by a computer, such as computer 100. Method 400 may be executed by a first device, such as primary device 210. Method 400 may be executed by a second device, such as secondary device 220. In some embodiments, certain portions or operations of method 400 may be performed by multiple computing devices, such as certain operations being performed by first device 310 and other operations being performed by second device 320.

At 410, the presence of a secondary device may be detected. The presence of a secondary device may be detected by listening for wireless signals, such as receiving a heartbeat or other status datagram by a transceiver of primary device 210 from secondary device 220. The presence of a secondary device may be detected by actively requesting status or updates from other devices—for example, by a primary device sending out a request for presence messages to accessory devices.

At 420, a primary device may attempt to identify a current placement of a secondary device. The primary device may attempt to identify the current placement of a primary device in response to receiving a device placement signal from a secondary device. For example, second device 320 may communicate that it recently received a sequence of placements that indicate the device is configured for RDPC based on a future placement of the second device 320.

If a current placement of a secondary device cannot be identified at 430:N, method 400 may end at 495. If a current placement of a secondary device is identified at 430:Y, method 400 may continue by determining a potential future placement of a secondary device. The determination of a potential future placement may include determining multiple, or a plurality of, potential future placements. For example, the primary device may request the current placement from the secondary device at 420, and responsively at 440, the primary device may generate a list of potential future placements for the secondary device. In some embodiments, the determination of future placements may be based on information from the secondary device about the current placement. For example, the secondary device may communicate its current placement including an orientation, translation, relative position, or other relevant placement data to the primary device. In some embodiments, the secondary device may communicate a list of future placements for the secondary device to the primary device along with the communication of the current placement.

The determination of a potential future placement of a secondary device may be related to the current position and may be updated based on an updated current position. For example, at 440 a primary device may determine the list of future candidate placements based on current position, orientation, and other relevant sensor data that is received from an accessory device. If, during determination of future candidate placements, a user moves, translates, rotates, lifts, or otherwise alters the placement of the secondary device, the determination process of operation 440 may be repeated. For example, a user may currently be responding to a text message on a secondary device that is a smartphone during operation 440, and the user may be setting the smartphone on a table. the determination of future placements may include receiving a stream of movement data from IMU sensors of the smartphone, and the determination of future placements may be paused until the device stops moving.

At 450, the list of potential future placements of the secondary device may be ranked. Ranking of the list of potential future placements may include prioritization the future placements based on one or more factors. Factors may be related to the primary device, such as a location of the secondary device in relation to the primary device. Factors may be related to previous placements of the secondary device, such as the most recently used placements for alteration of configuration of RDPC between the primary device and the secondary device. The prioritization of the placements may be based on input from a user. For example, a user may be presented by a user interface of the primary device a list of ranked potential future placements. The user may be prompted to select a potential future placement from the list.

At 460, a first candidate future placement of the secondary device may be selected. The first candidate future placement of the secondary device may be selected based on the list. In some embodiments, the first candidate future placement may be selected based on the prioritization or ranking of the list. For example, a particular potential future placement may be designated as first candidate future placement based on being ranked above other potential future placements. After a candidate is selected, method 460 may end at 495.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
    detecting, by a primary device, a presence of a secondary device, wherein the primary device is operating in a first configuration, wherein the primary device and the secondary device are physically separate devices;
    identifying, by the primary device, a current placement of the secondary device, wherein the current placement of the secondary device includes the placement of external features of the secondary device in relation to the primary device;
    determining, by the primary device and based on the current placement of the secondary device, a list of potential future placements of the secondary device;
    prioritizing, by the primary device, the list of potential future placements of the secondary device; and
    selecting, by a primary device and based on the list, a first candidate future placement of the secondary device.

2. The method of claim 1, further comprising:
    assigning, by the primary device based on the first candidate future placement, a second configuration for a future operation of the primary device; and
    communicating, by the primary device and based on the assigned second configuration, the first candidate future placement of the secondary device.

3. The method of claim 2, wherein the primary device is communicatively coupled to a display, and wherein the communicating the first candidate future placement includes visually communicating by the display the first candidate future placement.

4. The method of claim 2, wherein the primary device is communicatively coupled to an audio transceiver, and wherein the communicating the first candidate future placement includes audibly communicating by the audio transceiver the first candidate future placement.

5. The method of claim 2, further comprising:
    selecting, by the primary device and based on the list, a second candidate future placement of the secondary device;
    assigning, by the primary device, a third configuration for a future operation of the primary device; and
    communicating, by the primary device and based on the assigned third configuration, the first candidate future placement of the secondary device.

6. The method of claim 2, wherein the assigning the second configuration is based on one or more previous configurations of the primary device.

7. The method of claim 6, wherein the one or more previous configurations of the primary device include at least two or more previous configurations, and wherein the assigning the second configuration includes ranking the previous configurations of the primary device based on assigning each previous configuration of the previous configurations a likelihood score.

8. The method of claim 2, wherein the assigning the second configuration is based on the first configuration of the primary device.

9. The method of claim 1, further comprising:
    identifying, by the primary device, an updated current placement of the secondary device;
    determining, by the primary device and based on the updated current placement of the secondary device, a second list of potential future placements of the secondary device;
    prioritizing, by a primary device, the second list of potential future placements of the secondary device; and
    selecting, by a primary device and based on the list second, a second candidate future placement of the secondary device.

10. The method of claim 1, wherein the identifying the current placement is based on operating in a listening mode for a placement signature, and wherein the method further comprises:
    monitoring, during the listening mode, a sequence of secondary device placements of the secondary device; and
    determining, based on the sequence of secondary device placements, the placement signature.

11. A system, the system comprising:
    a memory, the memory containing one or more instructions; and
    a processor, the processor communicatively coupled to the memory, the processor, in response to reading the one or more instructions, configured to:

detect a presence of a secondary device, wherein a primary device is operating in a first configuration, wherein the primary device and the secondary device are physically separate devices;

identify a current placement of the secondary device, wherein the current placement of the secondary device includes the placement of external features of the secondary device in relation to the primary device;

determine, based on the current placement of the secondary device, a list of potential future placements of the secondary device;

prioritize the list of potential future placements of the secondary device; and select, based on the list, a first candidate future placement of the secondary device.

12. The system of claim 11, wherein the processor is further configured to:

assign, based on the first candidate future placement, a second configuration for a future operation of the primary device; and communicate, based on the assigned second configuration, the first candidate future placement of the secondary device.

13. The system of claim 12, wherein the processor is further configured to:

communicate the assigned second configuration of the primary device.

14. The system of claim 12, wherein the primary device is communicatively coupled to a display, and wherein the communicating the first candidate future placement includes visually communicating by the display the first candidate future placement.

15. The system of claim 12, wherein the primary device is communicatively coupled to an audio transceiver, and wherein the communicating the first candidate future placement includes audibly communicating by the audio transceiver the first candidate future placement.

16. A computer program product, the computer program product comprising:

one or more computer readable storage media; and program instructions collectively stored on the one or more computer readable storage media, the program instructions configured to:

detect a presence of a secondary device, wherein a primary device is operating in a first configuration, wherein the primary device and the secondary device are physically separate devices;

identify a current placement of the secondary device, wherein the current placement of the secondary device includes the placement of external features of the secondary device in relation to the primary device;

determine, based on the current placement of the secondary device, a list of potential future placements of the secondary device;

prioritize the list of potential future placements of the secondary device; and select, based on the list, a first candidate future placement of the secondary device.

17. The computer program product of claim 16, wherein the program instructions are further configured to:

assign, based on the first candidate future placement, a second configuration for a future operation of the primary device; and communicate, based on the assigned second configuration, the first candidate future placement of the secondary device.

18. The computer program product of claim 17, wherein the program instructions are further configured to:

communicate the assigned second configuration of the primary device.

19. The computer program product of claim 17, wherein the primary device is communicatively coupled to a display, and wherein the communicating the first candidate future placement includes visually communicating by the display the first candidate future placement.

20. The computer program product of claim 17, wherein the primary device is communicatively coupled to an audio transceiver, and wherein the communicating the first candidate future placement includes audibly communicating by the audio transceiver the first candidate future placement.

* * * * *